(12) United States Patent  
Pound et al.

(10) Patent No.: US 8,495,972 B1
(45) Date of Patent: Jul. 30, 2013

(54) AUTOMATED INJECTION SYSTEM

(75) Inventors: Joe M. Pound, Ingram, TX (US); Gary R. Earl, Kerrville, TX (US); Randy W. Ryan, Jr., Harper, TX (US); Gordon K. Shelley, Kerrville, TX (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 275 days.

(21) Appl. No.: 12/845,281

(22) Filed: Jul. 28, 2010

(51) Int. Cl.
*A01K 29/00* (2006.01)

(52) U.S. Cl.
USPC .......................................................... 119/174

(58) Field of Classification Search
USPC ............... 119/174, 417; 604/152; 43/131, 43/63, 64, 65, 66, 67, 68, 69, 70, 71, 72, 43/73, 77
See application file for complete search history.

(56) References Cited

U.S. PATENT DOCUMENTS

| | | | |
|---|---|---|---|
| 3,217,445 A * | 11/1965 | Wade | 43/131 |
| 3,225,485 A * | 12/1965 | Powell | 43/67 |
| 3,641,998 A * | 2/1972 | Lyon et al. | 604/152 |
| 3,880,162 A | 4/1975 | Simmons | |
| 3,949,746 A | 4/1976 | Wallach | |
| 3,964,481 A * | 6/1976 | Gourlandt et al. | 604/152 |
| 4,062,142 A * | 12/1977 | Marotti | 43/61 |
| 4,513,691 A * | 4/1985 | Wood | 119/734 |
| 4,541,199 A * | 9/1985 | Reidinger, Jr. | 43/131 |
| 4,652,261 A | 3/1987 | Mech et al. | |
| 4,653,221 A * | 3/1987 | Pratscher | 43/64 |
| 4,825,581 A * | 5/1989 | Dailey | 43/131 |
| 5,311,841 A * | 5/1994 | Thaxton | 604/506 |
| 5,816,256 A * | 10/1998 | Kissinger et al. | 128/897 |
| 5,881,672 A | 3/1999 | Pound et al. | |
| 6,482,187 B1 | 11/2002 | Gibbs | |
| 6,502,531 B1 | 1/2003 | Pound et al. | |
| 6,878,052 B2 * | 4/2005 | Andersson | 452/149 |
| 8,211,058 B2 * | 7/2012 | Jorna | 604/131 |
| 2003/0038721 A1 | 2/2003 | Hogan | |
| 2007/0093747 A1 * | 4/2007 | Smith | 604/67 |

* cited by examiner

*Primary Examiner* — Yvonne Abbott

(74) *Attorney, Agent, or Firm* — John Fado; Robert D. Jones; Lesley Shaw

(57) ABSTRACT

The injection system provides an automated means to safely inject a target animal. In the preferred embodiment, the automated injection system injects an animal with a radio frequency identification device (RFID). The automated injection system includes a baiting station with multiple sensors that confirm the position of a target animal and initiate the injection process. A controller actively controls the injection process and records the identification data associated with each injected animal.

19 Claims, 3 Drawing Sheets

AUTOMATED INJECTION SYSTEM

FIELD OF THE INVENTION

The present invention relates to a method and apparatus for injecting an animal. Specifically, the invention relates to a system comprising a controllable bait station and associated automated injector that (among other things) confirms that a target animal is positioned so that the injector extends and injects the target animal. In the preferred embodiment, the animal is injected with a radio frequency identification device (RFID).

BACKGROUND OF THE INVENTION

Electronic identification is increasingly used in a variety of applications. In at least one of these applications, RFID "tags" may be used to uniquely identify wild or domestic animals. A variety of medical and physical information associated with each individual animal may be recorded on an associated RFID device implanted under the skin of an animal. After an animal is "tagged" with an RFID, the animal's handlers can identify and distinguish animals that have been medically treated or vaccinated from those animals that have not been treated. This identification ensures that valuable resources are not wasted by repeatedly treating the same animals, and ensures that all untreated animals can be identified and eventually treated.

However, implantation of RFID tags can be problematic, particularly in the case of wild animals. Currently, wild animals must be restrained and/or darted with a tranquilizer so that a handler can inject an RFID tag below the skin of each animal. If the amount of tranquilizing agent is too high, the tranquilizer can be fatal. If the amount of tranquilizer is too low, the animals are not actually sedate enough to be captured and handled safely. In many cases darted animals elude their handlers and thereby escape capture, only to lose consciousness later in an uncontrolled area where the animals are vulnerable to predators and scavengers. The inventors have found that approximately twenty percent of the target animals die during the tranquilization/sedation process.

In addition to being dangerous to the animal, the current tranquilization process is time consuming and dangerous for the animal's handlers. Impaired animals are notoriously unpredictable and injuries to handlers are common. Handlers are also vulnerable to a variety of diseases (like Lyme disease) and parasites that can be spread from animals to humans.

The need exists for a safe, non-stressful way to inject an animal with (for example) an RFID tag so that sedation/tranquilization of the animal is unnecessary. The current invention comprises a passive means of achieving RFID tag insertion that is safe for the animal and also safe for the animal's handlers. The current invention comprises a system that includes a controllable and automated bait station and an associated injector mechanism that incorporates multiple safety features to ensure that the animal is safely injected.

SUMMARY OF THE INVENTION

The current invention is directed to an automated injection system. The system comprises a bait station which includes an injection mechanism. At least one sensor is in communication with the injection mechanism. The bait station is structured so that when the sensor senses a target animal at the station, the injection mechanism injects the animal.

The current invention is also directed to an automated injection mechanism. The injection mechanism comprises an injection module that is mounted on a slidable carriage. An inertial weight is disposed adjacent to the injection module. In operation, a sensor causes a release assembly to release the slidable carriage so that the carriage is accelerated toward a target animal. When the carriage slows, the inertial weight continues to move forward and depresses a portion of the injection module, thereby causing the injection module to inject the target animal.

The current invention is further directed to a method of automatically injecting a target animal. As an initial step, a bait station is provided that includes an automated injection system. A target animal is then lured to the bait station. When a sensor at the bait station senses the presence of the target animal, the automated injection system injects the target animal.

DETAILED DESCRIPTION OF PREFERRED EMBODIMENTS

Figure 1:
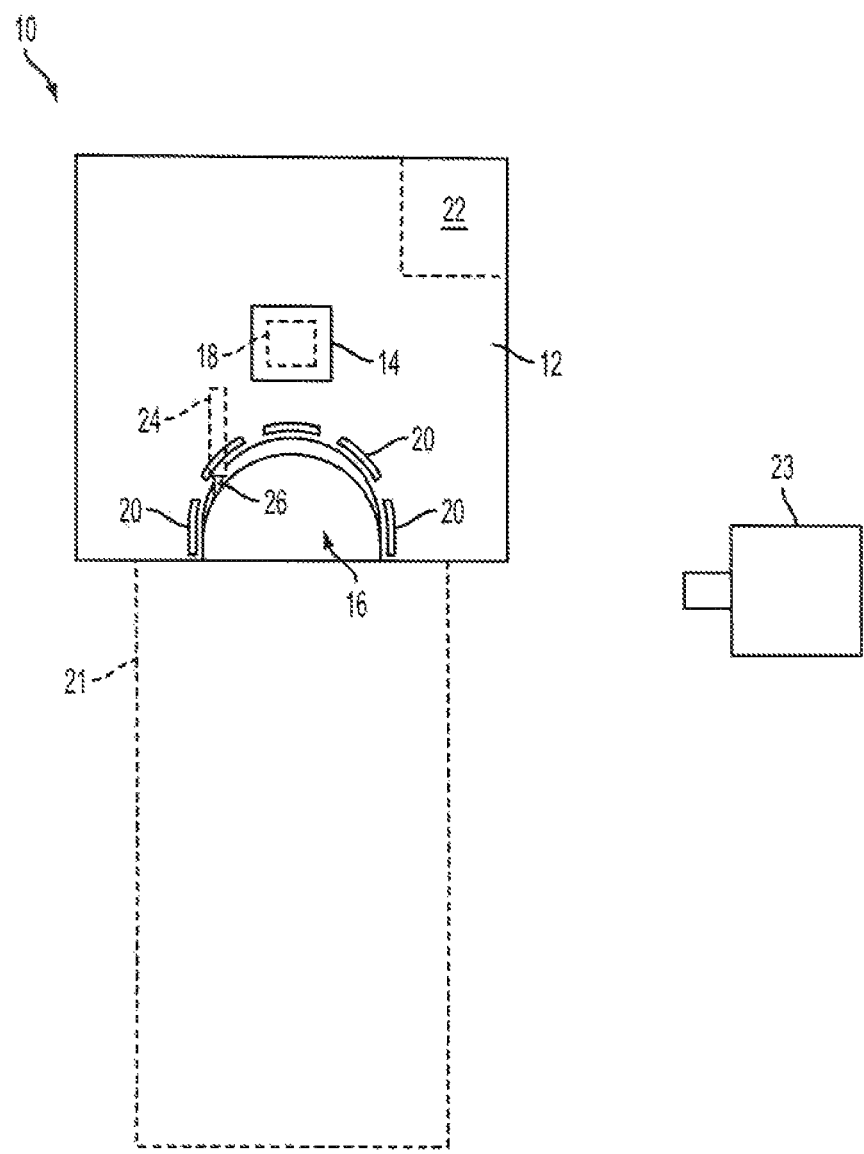
FIG. 1 is a schematic of the bait station of the current invention.

The present invention comprises an automated and controllable animal baiting station. FIG. 1 generally shows a schematic of the baiting station 10. In the preferred embodiment, the baiting station 10 is designed to inject an RFID tag into a ruminant such as white-tailed deer. The RFID tags include at least identification data and may also include a variety of biomedical and/or tracking data. In alternative embodiments, the baiting station 10 may be modified to inject target animals with a variety of inoculation or treatment fluids. In further alternative embodiments the system may be used to inject other types of animals and may also perform additional tasks complementary to, or unrelated to injection.

As generally shown in FIG. 1, the baiting station 10 comprises a housing 12 which includes at least one bait holder 14. At least one side of the bait station 10 comprises a bait access inlet 16. In operation, an animal must enter the access inlet 16 and position his torso adjacent to an inner edge of the inlet 16 to have access to feed/bait within the bait holder 14.

Once the animal is in position in the access inlet 16, a feeding sensor 18 confirms that the animal's head is proximate the bait holder 14. A variety of neck and chest sensors 20 positioned along the edge of the access inlet 16 confirm the position of the animal's neck and chest. The sensors 18, 20 may be of any variety known in the art consistent with the function of confirming the position of a target animal. For example, the sensors 18, 20 may comprise thermal registry-type instruments, electric eye-type proximity devices, mechanical contact-type buttons/pads/levers and the like, or any other type of sensor known in the art.

In the preferred embodiment, information from the sensors 18, 20 is fed to a controller 22 which processes the sensor data. Based on information from the sensors 18, 20, the controller may detect the presence or absence of an RFID, and may interpret information on the RFID device or may modify information on the RFID. The controller 22 and associated sensors 18, 20 may also sense information from neck collars, ear tags, and other conventional animal identification devices. A key function of the controller 22 is to act as a safety device to ensure that the desired target animal is in the access inlet and that a person or a non-target animal is not inadvertently injected.

The controller 22 may be directly connected or hard-wired to the sensors 18, 20, or may communicate wirelessly with the sensors 18, 20. When the controller 22 makes the appropriate determination, the controller 22 sends a signal to an injection mechanism 24 to inject the target animal. Upon receiving the injection signal from the controller 22, a delivery portion 28 (see FIGS. 2 and 3) of the injection mechanism 24 moves through an aperture 26 in the edge of the access inlet 16 and injects the target animal with an RFID chip/tag or other material, as required. The controller 22 may be directly connected or hard-wired to the injection mechanism 24, or may communicate wirelessly with the injection mechanism 24.

In addition to identifying a target animal, a variety of biomedical and tracking data may be read from, or programmed into an RFID chip, including inoculation information and medical treatment data. FIG. 1 shows an embodiment of the bait station 10 that includes a scale 21 and a camera 23 that may also be in contact with the controller 22. The camera 23 and scale 21 allow handlers to associate a weight and an image with the animal corresponding to electrical identification data provided by the RFID chip. The bait station 10 may include other types of sensors that communicate with the controller 22 so that a variety of additional data corresponding to an injected animal may be recorded.

Figure 2:
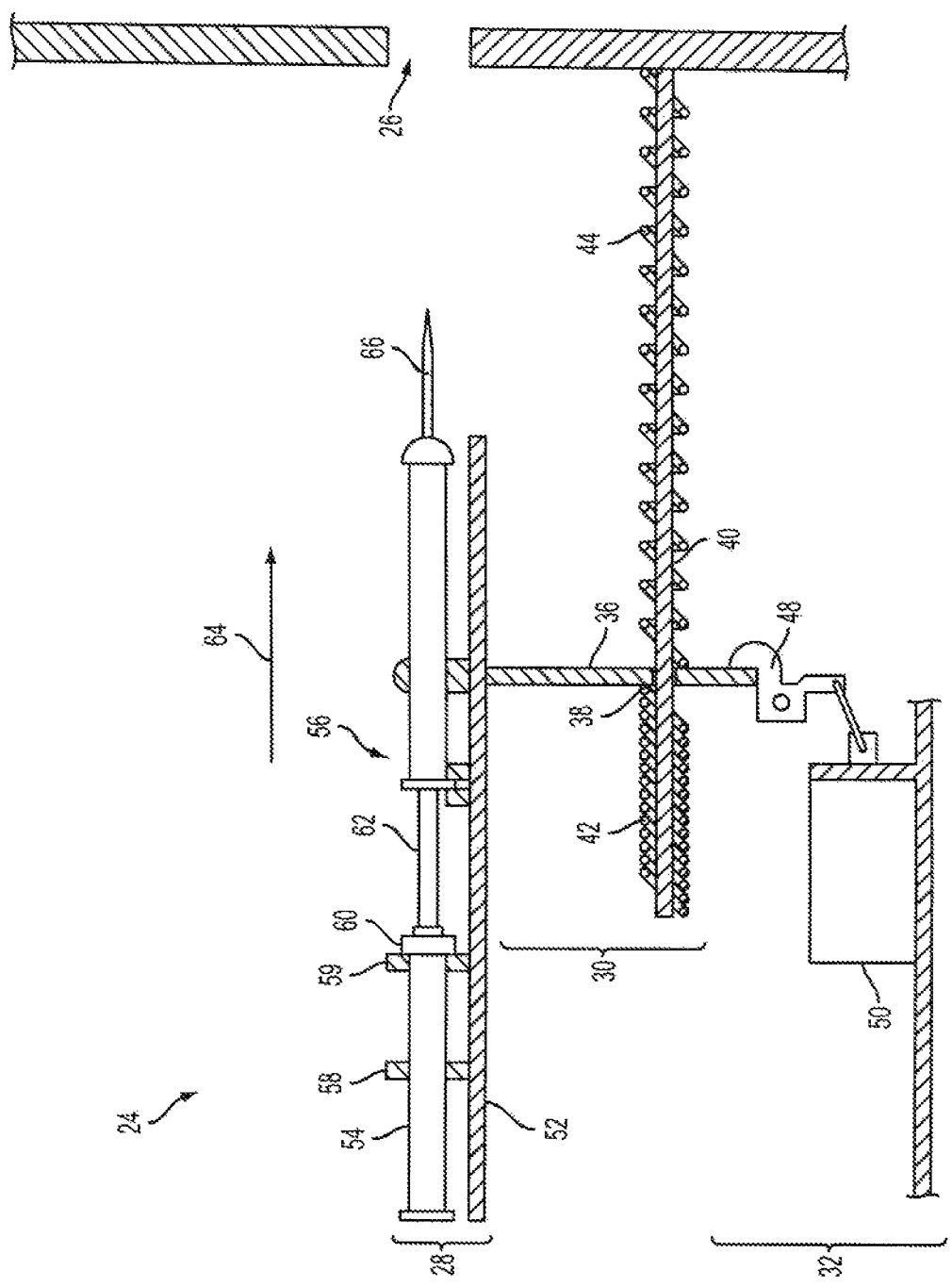
FIG. 2 is a partial sectional schematic of the injection mechanism in the "cocked" position.
Figure 3:
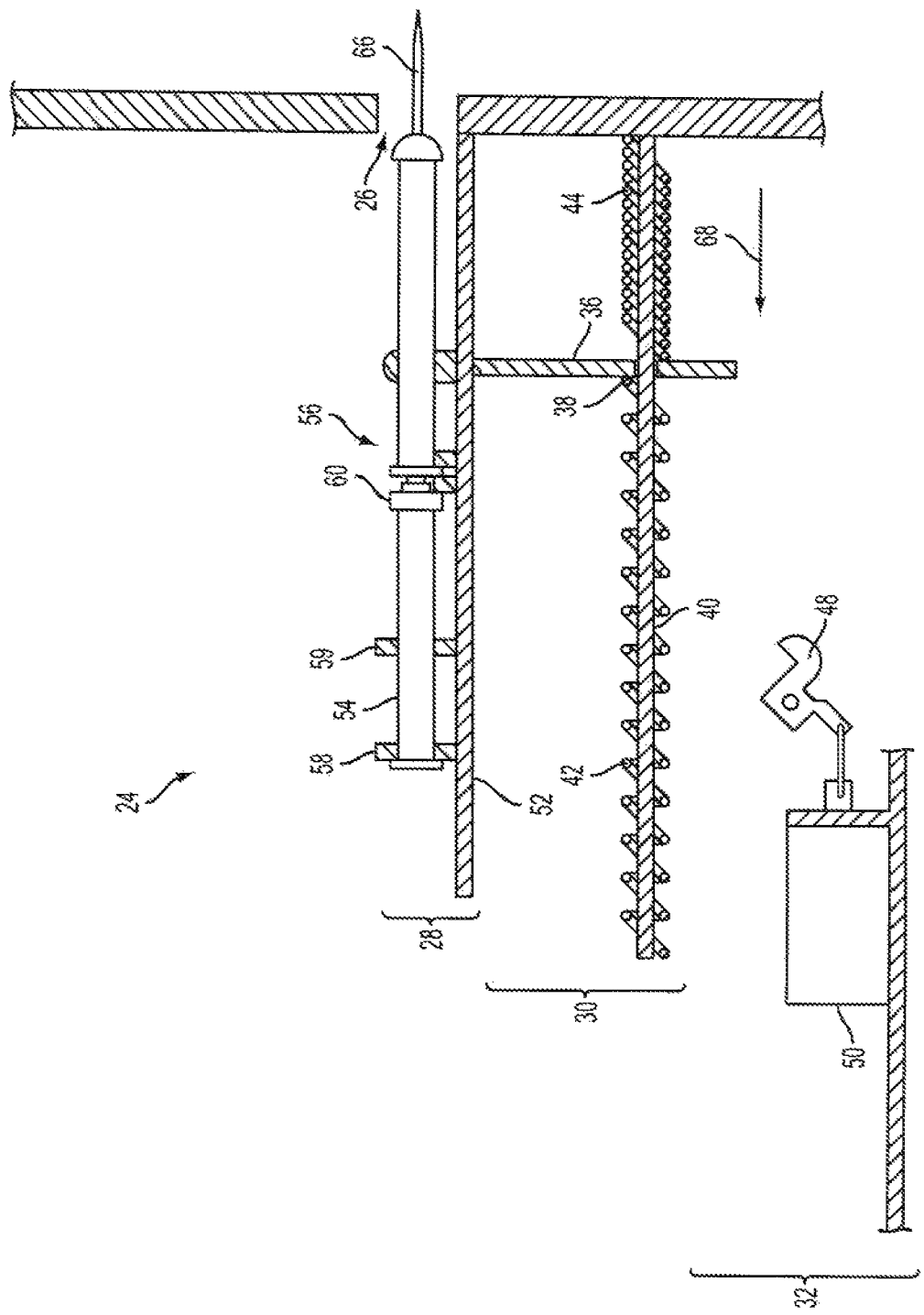
FIG. 3 is a partial sectional schematic of the injection mechanism in the "injection" position.

FIGS. 2 and 3 show partial sectional schematics of the injection mechanism 24 shown in FIG. 1. The injection mechanism 24 comprises a moveable delivery portion 28, a stationary portion 30, and a release assembly 32. An accelerator linkage 36 connects the release assembly 32, the stationary portion 30 and the delivery portion 28. An aperture 38 in the accelerator 36 is positioned so that a traverse rod 40 extends through the aperture 38. An injector motive means 42 and a retractor motive means 44 move the accelerator 36 laterally along the traverse rod 40.

In the preferred embodiment, the injector 42 and retractor 44 motive means comprise mechanical compression springs. Specifically, an injection spring 42 and a retraction spring 44 coil around the traverse rod 40 on opposite sides of the accelerator 36. In alternative embodiments, the injector and retractor motive means may be supplied by an electrical, hydraulic, or pneumatic force, or by an alternative mechanical force. As shown in FIG. 2, at the initiation of an injection cycle, the delivery portion 28 is retracted so that the injection spring 42 is compressed and the delivery portion 28 is maintained in a "cocked" position by the release assembly 32.

The release assembly 32 comprises a release mechanism 48 and an actuator 50. As shown in FIG. 2, one end of the release mechanism 48 is releasably attached to the accelerator 36 and the other end of the release mechanism 48 is attached to the actuator 50. In the preferred embodiment, the actuator is an electronic solenoid 50 that is in communication with the controller 22 (see FIG. 1). When instructed by the controller 22, the solenoid 50 causes the release mechanism 48 to release the accelerator 36 and the attached delivery mechanism 28 so that the needle 66 of the delivery mechanism 28 advances through the aperture 26 and injects the target animal.

The delivery portion 28 comprises a sliding carriage 52, an inertial weight 54, and an injection module 56. In the preferred embodiment, the injection module 56 is a conventional syringe. As shown in FIG. 2, the carriage 52 is attached to an upper end of the accelerator 36. A cylindrical inertial weight 54 is attached to a rear portion of the carriage 52 so that the inertial weight 54 slides freely within the carriage guide rings 58, 59. A head 60 of the inertial weight 54 abuts a plunger portion 62 of the syringe 56.

In operation, as shown in FIGS. 2 and 3, when the release assembly 32 receives a signal from the controller 22, the release assembly 32 releases the accelerator 36. The injection spring 42 propels the accelerator 36 in the direction of the arrow 64 toward the aperture 26. Ultimately the needle portion 66 of the syringe 56 extends through the aperture 26.

As the needle penetrates the skin of a target animal, the inertia developed by the forward progress of the carriage 52 causes the inertial weight 54 to slide in the direction of the arrow 64 and depress the plunger 62 of the syringe 56, thereby injecting the target animal. FIG. 3 shows the delivery portion 28 in the "injection" position associated with actual injection of a target animal. Note that the needle 66 extends through the aperture 26 and the inertial weight 54 fully depresses the plunger 62 (not visible in FIG. 3) of the syringe 56. After injection, the retraction spring 42, which is now fully compressed, expands and exerts a force in the direction of the arrow 68 so that the needle 66 is retracted from the target animal.

After the injection, the carriage slide 52 (and associated inertial weight 54 and syringe 56) may be reset via a cable or piston retraction system, or by any means known in the art consistent with compressing the injection spring 42 and re-setting the release assembly 32 and delivery portion 28 to the "cocked" position shown in FIG. 2. Also after injection, the syringe injection module 56 may be ejected and replaced by a reset and "loaded" module 56. In alternative embodiments, the RFID or injection dose is stored in the needle 66 so that after injection, only the end portion of the injection module 56 and the spent needle 66 (with an associated tag or dose) is replaced.

For the foregoing reasons, it is clear that the invention provides an innovative injection system that may be used in various applications. The invention may be modified in multiple ways and applied in various technological applications. For example, although the preferred embodiment is directed toward injecting an RFID tag into a wild animal, the invention may be used to inject any substance into any creature.

The current invention may be modified and customized as required by a specific operation or application, and the individual components may be removed and re-defined, as required, to achieve the desired result. For example, the automated injection mechanism 24 best shown in FIGS. 2 and 3 may be reconfigured in the form of a handheld "gun" to quickly and effectively deliver an injection to primarily captive or domestic animals. In this embodiment, the sensor would comprise a portion of the release mechanism and the user operating the gun would act as the sensor and controller. An injection gun would be more robust and the injection procedure would be quicker and less likely to be disrupted by unanticipated movements of the animal than the current hand-operated syringe injection process.

Although the materials of construction are not described, they may include a variety of compositions consistent with the function of the invention. Such variations are not to be regarded as a departure from the spirit and scope of the invention, and all such modifications as would be obvious to one skilled in the art are intended to be included within the scope of the following claims.

What is claimed is:

1. An injection system comprising:
   a station;
   an injection mechanism disposed in or adjacent to the station;

at least one sensor in communication with the injection mechanism; and, a non-tunnel access inlet, the sensor sensing a target animal in the inlet, the station being structured so that the target animal is a ruminant;

wherein the station is structured so that when the sensor senses the animal at the station inlet, the injection mechanism injects the animal.

2. The injection system of claim 1 wherein the station is structured so that the animal is lured into an access inlet, the sensor sensing the animal's presence in the inlet and causing the injection mechanism to extend into the inlet and inject the animal in the chest or front portion of the neck.

3. The injection system of claim 2 wherein the animal is lured into the inlet by bait, the station comprising a bait station.

4. The injection system of claim 3 further comprising a bait holder, the bait station being constructed so that the animal can only access the bait holder by entering the inlet.

5. The injection system of claim 4 wherein a sensor is positioned in or adjacent to the bait holder.

6. The injection system of claim 1 wherein the injection mechanism injects one of a fluid or a radio frequency identification device (RFID).

7. The injection system of claim 1 wherein the at least one sensor includes an electronic sensor that is also structured to communicate with a computer-based controller in the station, the controller records data including identification data so that an RFID injected into the animal electronically identifies the injected animal.

8. The injection system of claim 7 wherein the RFID contains biomedical or tracking data associated with the injected animal.

9. The injection system of claim 7 whereby based on information from the at least one sensor, the controller distinguishes between the target animal and a non-target.

10. The injection system of claim 1 wherein the injection mechanism comprises a delivery portion, a stationary portion, and a release assembly, the release assembly comprising an electrical solenoid which releases the delivery portion.

11. The injection system of claim 10 wherein the delivery portion comprises a syringe, injection being initiated through movement of an inertial weight which depresses a plunger portion of the syringe.

12. The injection system of claim 10 wherein the stationary portion comprises an injection spring which propels the delivery portion into the animal, and a retraction spring which retracts the delivery portion after injection.

13. An automated injection mechanism comprising:
a sensor;
a release assembly in communication with the sensor;
a slideable carriage in communication with the release assembly;
an inertial weight disposed on or adjacent to the carriage;
an injection module disposed on or adjacent to the carriage, the injection module being adjacent to the weight;
wherein the mechanism is structured so that when the sensor directs the release assembly to release the carriage, the carriage is accelerated toward a target animal so that when movement of the carriage slows, the weight depresses the injection module so that the injection module injects the animal.

14. The injection mechanism of claim 13 wherein the sensor senses a presence of the animal and automatically injects the animal.

15. The injection mechanism of claim 13 wherein the sensor communicates with the release assembly via a controller.

16. The injection mechanism of claim 15 wherein the sensor is an electronic sensor, the release assembly comprises a solenoid, and the controller comprises a computer processor.

17. The injection mechanism of claim 13 wherein the release assembly comprises a trigger mechanism and the controller comprises a user.

18. A method of automatically injecting a target animal, the method comprising the steps of:
providing a station with an automated injection system;
luring the target animal to a non-tunnel access inlet;
sensing a presence of the animal at the station; and
injecting the animal.

19. The method of claim 18 whereby, in the luring step, the animal is lured to the station by a bait so that the station comprises a bait station.

* * * * *